Feb. 5, 1946.   S. H. NOBLE ET AL   2,394,095
ACTIVATED ELECTRODE
Filed Jan. 26, 1945

THORATE OF ALKALINE EARTH METAL

INVENTORS
SIDNEY H. NOBLE
HAROLD P. ROOKSBY
BY John J. Anderson
THEIR ATTORNEY

Patented Feb. 5, 1946

2,394,095

UNITED STATES PATENT OFFICE 2,394,095

ACTIVATED ELECTRODE

Sidney H. Noble, Harrow Weald, and Harold P. Rooksby, Wealdstone, England, assignors to General Electric Company, a corporation of New York Application January 26, 1945, Serial No. 574,814
In Great Britain January 19, 1944

4 Claims. (Cl. 250—27.5)

This invention relates to emissive electrodes or cathodes for electric discharges, and is especially concerned with "active" materials of low work function. A thermionic electrode such as here referred to may consist of a metallic base, usually of refractory metal like tungsten or tantalum, and often in the form of a filamentary wire or coil, which is coated or charged with the activating material; or it may consist of a perforated or openwork metal container as base with a filler or charge of the activating material therein, like a rod or slug in a helical coil of refractory metal wire. To render the electrode and the activating material electron-emissive, they may be heated either by the discharge to the electrode, or by passage of electric current from a suitable source through a coil of tungsten or other metal. Activating materials heretofore generally used, comprise oxides or silicates of alkaline earth metals, such as BaO or $BaSiO_3$. Thoria, $ThO_2$, has been used for the same general purpose in the form of inclusions in refractory metal, as exemplified by so-called thoriated tungsten wire or slugs. Metallic thorium in a tungsten wire coil has also been used.

Figure 1:
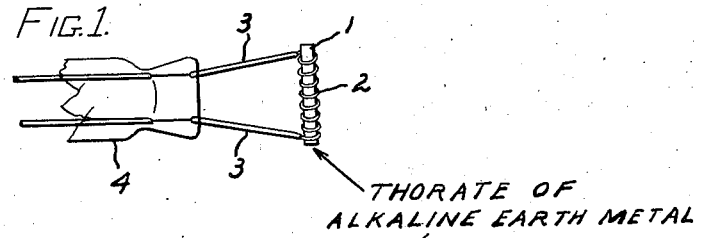
Figure 2:
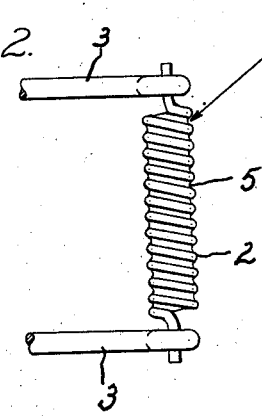

Various features of our invention will appear from the following detailed description and from the drawing which shows illustrative examples wherein Fig. 1 is a plan view of a stem and cathode structure embodying our invention, and Fig. 2 is a fragmentary plan view of a modification.

In accordance with our invention, one or more of the ordinary alkaline earth metals is intimately associated or combined with thorium in the activation of an electrode. A suitable material of this character is an alkaline earth thorate, as we term it, represented by the general formula $MThO_3$ where M is one of the ordinary alkaline earth metals calcium, strontium, and barium, or may involve two or more of them. Thus, for instance, barium thorate may be represented by the formula $BaThO_3$. Preferably part at least of M is Ba; and it is particularly preferred that M be part Ba and part Ca. Such a thorate material can be formed by heating an intimate mixture of $MCO_3$ and $ThO_2$ to a sufficiently high temperature. However, we have found that it is not always necessary or even preferable for the proportions of the mixture to correspond stoichiometrically to the formula $MThO_3$. This may be because the temperature of heating is so high that there is appreciable loss of a component (especially BaO) during the heating; or it may be that an excess of such component in the product is actually beneficial; or both these actions may be involved in some cases. In any case, the $CO_2$ of the $MCO_3$ goes off during the heating, regardless of whether the amount of $MCO_3$ exceeds the stoichiometric proportion or not.

One method of preparing the activating material according to the invention will now be described, by way of illustration.

Barium carbonate, calcium carbonate, and thorium oxide in finely powdered form are thoroughly mixed together in the following mol proportions:

$$2.5BaCO_3 + 1CaCO_3 + 2.5ThO_2$$

This, it will be seen, represents a substantial excess of the combined $BaCO_3$ and $CaCO_3$ over the $ThO_2$. A sufficient amount of a suitable binder is added and thoroughly mixed in, such as gum tragacanth, to enable the mixture to be extruded into rod form. The rods are placed in a molybdenum boat lined with magnesia plates, and are passed through an electric furnace maintained at 1600° C., in an atmosphere of hydrogen. The rods are brought up to 1600° C. in 7 min., and are kept at this temperature for 10 min. They are then cooled down to room temperature (some 20° C.) in a further period of 10 min. They may be mounted in coils in the usual way, about as exemplified in U. S. Patents Nos. 2,216,252 to Randall and 2,251,045 and 2,251,046 to Gaidies and Pirani.

Such a structure is shown in Fig. 1 wherein the rod 1 of alkaline earth thorate is supported in a coil 2, preferably of tungsten, which is mounted on lead-in wires 3 which are sealed in a stem 4.

In the case of cathode coils of tungsten wire which are to be coated or charged with the activating material, as exemplified in U. S. Patent No. 2,306,925 to Aicher, the mixture of powdered alkaline earth metal carbonates and thoria is intimately mixed with gum tragacanth, as above described, and this mixture is spread out on a piece of clean glass and there pressed into a cake. It is then cut up into slices which are placed in a boat and fired as above described. After cooling, the product is ground up in a ball mill till it will all pass a 325 mesh per inch screen. This powder is mixed with a suitable carbonaceous binder added to the ball mill, such as nitrocellulose lacquer, to enable the coils to be coated or charged therewith by dipping, as usual. About 1% of ammonium carbonate may be included in the binder to make it take the thorate better, or, in other words, to prevent the binder from "livering" or separating out of the emission mix. After the volatile liquid components of the binder have dried out, at atmospheric temperature or under a moderate heat of some 200° C., the coils may be heated to 1600° C. in an electric furnace as above described for the squirted rods, after which they may be mounted in the lead-clamps of lamp mounts before the latter are sealed into the lamp envelopes. Or the coils may be mounted in the lead-clamps of the lamp mounts before dipping, and only heated after being sealed into lamps, by passage of current through the coils during the exhaust-processing of the lamps. In this case, hydrogen may be passed through the lamps during the heating of the coils.

Such a cathode is shown in Fig. 2 wherein the coil 2 is provided with a coating or charge 5 of the alkaline earth thorate.

There is reason to believe that during the life of a lamp equipped with our electrodes, the thorate material not only affords a continual release and supply of thoria and metallic thorium at the active electrode surface, very much as in the case of a rod of thorium or a coil of thoriated tungsten wire, but that it also affords a continual release and supply of alkaline earth oxide and alkaline earth metal, e. g., barium and calcium. Not only this, but the combination of the thoria and the alkaline earth oxide in the thorate material seems to restrain or regulate the release of the several components mentioned in a favorable manner, so that they are not vaporized and lost too rapidly, with consequent blackening of the discharge envelope. However, the benefits of the invention are naturally independent of the correctness of any theory.

A further important advantage of alkaline earth thorate in cathodes is that it does not give rise to any carbon dioxide ($CO_2$) in the discharge device, either during exhaust processing or in the operating life of the device. This is in marked contrast with the considerable amounts of $CO_2$ evolving from ordinary emission mixes containing one or more alkaline earth carbonates. Such $CO_2$ is hard to remove from the device completely, and some of it often remains in cathodes activated with such mixes after the discharge devices have been exhaust-processed. Even when ammonium carbonate is used in the emission mix as described above, the amount of $CO_2$ evolving in the discharge device is much less than that from emission mixes of alkaline earth carbonates. The presence of residual $CO_2$ in discharge devices is a factor in various types of objectionable discoloration of the devices.

What we claim as new and desire to secure by Letters Patent of the United States is:

1. An electron emissive electrode comprising a metal base in combination with activating thorate of alkaline earth metal.

2. An electrode comprising a refractory metal coil charged with activating thorate of alkaline earth metal.

3. An electron emissive electrode comprising a metal base in combination with activating thorate of alkaline earth metal containing an excess of alkaline earth oxide over stoichiometric proportions represented by the formula $MThO_3$ where M is alkaline earth metal.

4. An electron emissive electrode comprising a metal base in combination with activating barium and calcium thorate.

SIDNEY H. NOBLE.
HAROLD P. ROOKSBY.